Aug. 11, 1931.  F. W. BAKER  1,817,906
WHEEL RIM
Filed Sept. 23, 1925  3 Sheets-Sheet 2
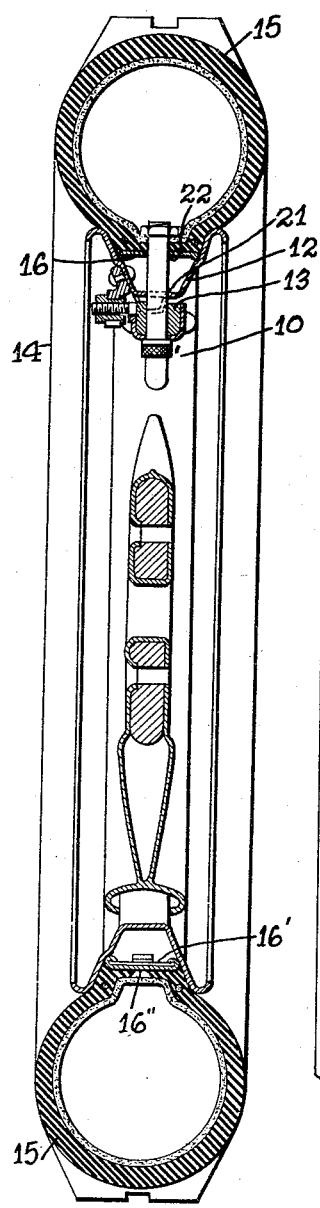
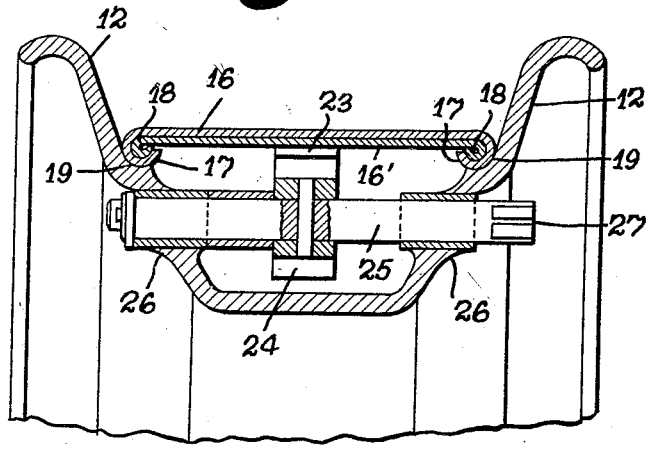
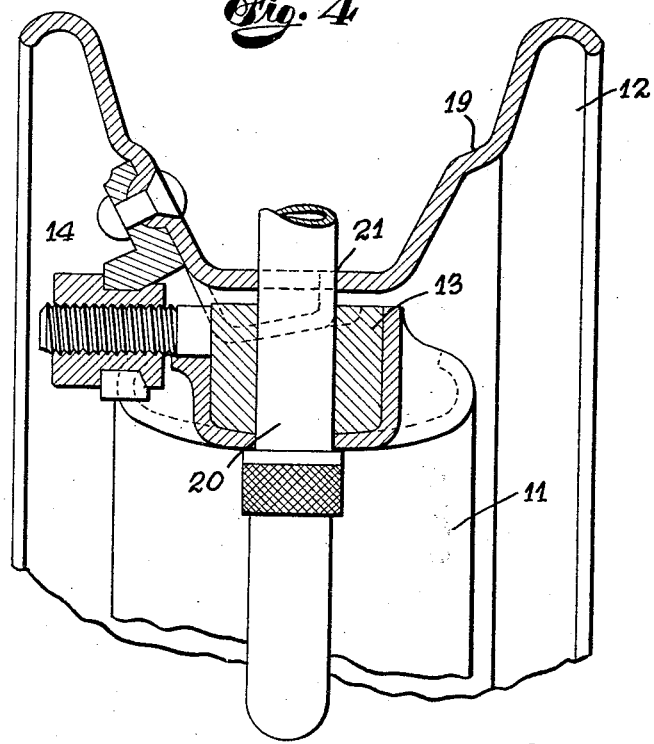
Inventor,
Frederick William Baker
By his Attorney,
Ramsay Hogue Aug. 11, 1931.  F. W. BAKER  1,817,906
WHEEL RIM
Filed Sept. 23, 1925  3 Sheets-Sheet 3
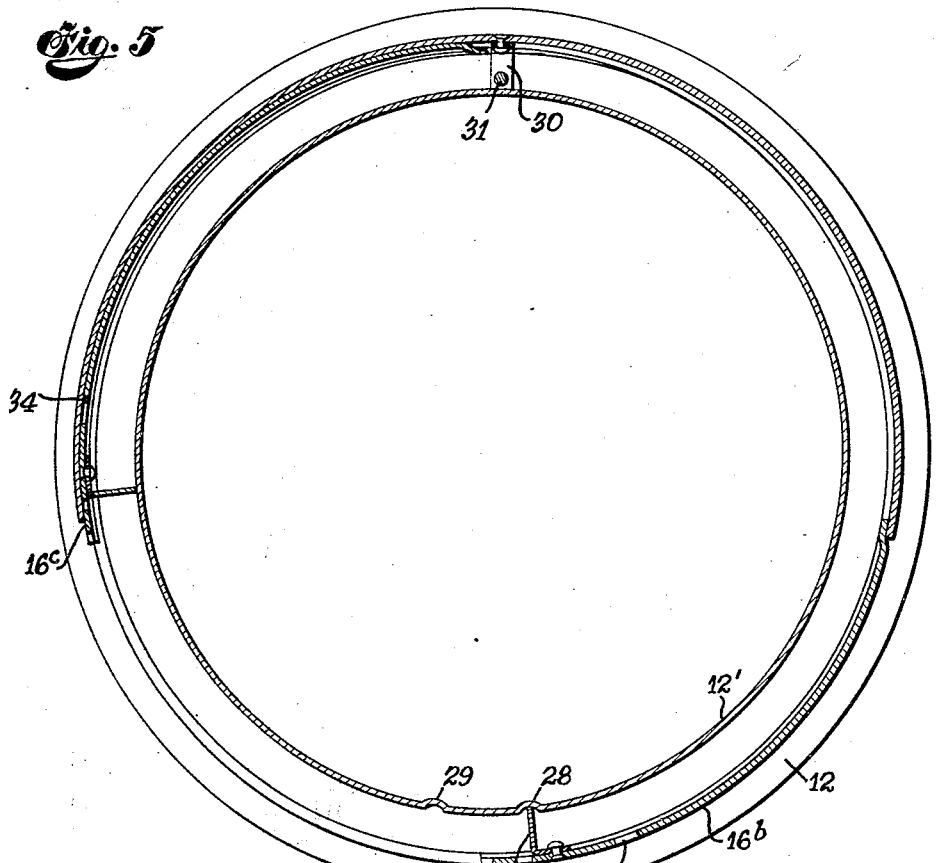
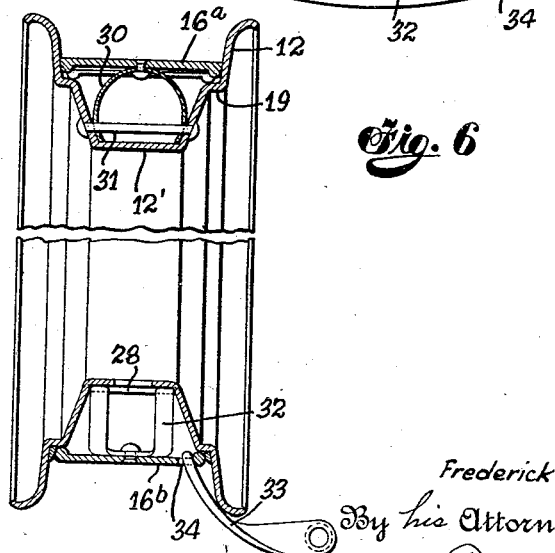
Inventor,
Frederick William Baker.
By his Attorney,
Ramsay Hoguet.

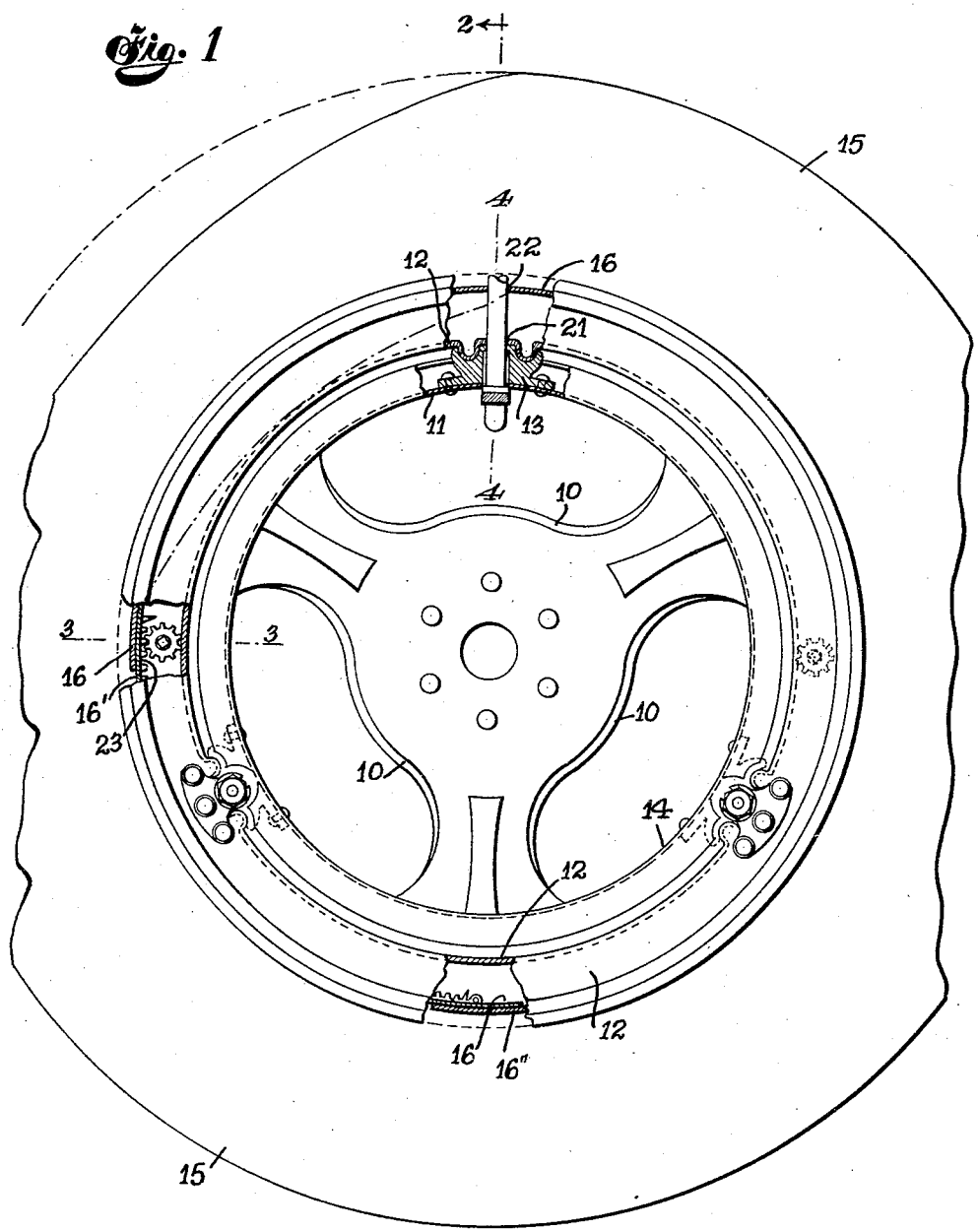

Patented Aug. 11, 1931

1,817,906

UNITED STATES PATENT OFFICE

FREDERICK WILLIAM BAKER, OF STOURBRIDGE, ENGLAND, ASSIGNOR TO TRINITY WHEEL CORPORATION, A CORPORATION OF NEW YORK

WHEEL RIM

Application filed September 23, 1925. Serial No. 58,136.

My invention relates to improvements in wheel rims, and more particularly to the rims of vehicle wheels such for example as motor car wheels, in which tires are used which are generally pneumatic and usually detachable. The object of my invention is to provide a bed which will lie within the outer circumference of the rim of any desired type, more particularly a rim which has circumferential flanges, and will support the inner surface of the tire. The bed is made with a portion or segment removable or displaceable, so that by such removal or displacement or adjustment, the length of the tire bed may be shortened or lengthened. Obviously when a section is removed or the tire bed shortened, the tire can then be readily slipped off over the edge of the rim, or as easily slipped on, and when the bed is again adjusted to its normal length, the tire will be held tight as usual. This provision for adjusting the length of the bed either by displacing or removing a portion, can be carried out in many ways. I prefer to make the aforesaid bed resilient, in which case it will assist the tire in its function of absorbing shocks and strains, and if the tire is constructed with this end in view, it will also assist the wheel in such shock absorbing function. My invention is particularly applicable to wheel rims which in its entirety includes a body formed with a base having side flanges or equivalent structures to hold a tire, and the bed lies within the circumference of such flanges, and as heretofore pointed out can be adjusted as to its length in many ways. Heretofore in attempting to produce a rim having a bed with a portion displaceable, a segment of the whole rim, or a substantial part thereof, has usually been made removable or displaceable, which is a very serious objection for the reason that such a structure is expensive, weakens the rim, and is difficult to adjust. Manufacturers object to making such a rim and car owners object to using it. My invention, however, is intended to preserve the continuity of the main part of the rim, especially the rim flanges, and provide a bed of the kind stated which can be applied to the wheel rim without weakening or breaking the main portions of the rim, and especially the flanges. All of which will be better understood from the description which follows.

More specifically in this structure my improved bed is shown applied to a drop centre rim with solid flanges, and in a companion case Serial No. 131,511, filed August 25, 1926, I have shown the application of a somewhat similar bed to a demountable rim.

Reference is to be had to the accompanying drawings forming a part of this specification, in which similar reference characters indicate corresponding parts in all the views.

Figure 1 is a broken side elevation partly in section of a wheel showing my improved bed construction.

Figure 2 is a cross section on the line 2—2 of Figure 1.

Figure 3 is a broken enlarged cross section on the line 3—3 of Figure 1.

Figure 4 is a broken enlarged cross section on the line 4—4 of Figure 1 with the bed removed and illustrating how a valve stem may pass through the parts.

Figure 5 is a diagrammatic section in the plane of the wheel showing a modification of my bed as applied to a wheel rim.

Figure 6 is a broken cross section of the structure shown in Figure 5, and illustrates also a modified means of adjusting the bed.

For purposes of illustration I have shown my improvements applied to a wheel having a three-armed spoke system 10, and inner and outer rims 11 and 12 spaced apart and connected by bearers 13 which are united by the bolt structure 14, which it is not necessary here to refer to in detail because my improvements are applicable to a wheel of any other type as well.

The rim 12, which in the present instance is the outer rim in its entirety including its base and side flanges forming a unitary body, and, may be of any approved form preferably dish shape or concave in cross section and which is adapted to receive the tire 15, this being shown as a conventional pneumatic tire which seats in the rim as usual, but the structure of both tire and rim can be varied almost indefinitely without affecting the invention.

Within the outer rim 12 I place my adjustable bed which is shown as comprising sections 16, 16' and 16", which are curved to form a circle, and which are displaceable and longitudinally adjustable to make the bed extensible and contractible. The bed formed of the said sections is preferably resilient, and in such case it will be seen that it forms a shock absorbing adjunct and assists in such functions which pertain to the tire and wheel.

The bed can be adjusted or displaced in part in many ways, and I have shown a few to illustrate the fact that no one way is essential. Figures 1 to 3 show what I consider a suitable means. As here illustrated one section 16 of the bed extends practically half around the wheel, and is anchored. The outer edges of this section are turned under in hook shape to form hollow beads 17 in which fit the bead edges 18 of the sections 16'—16" as the case may be. The beads or hollowed edges 17 can rest on shoulders 19 formed on the inner side portions of the wheel rim 12, and the parts 18 can fit corresponding shoulders after they leave the members 17. The bed member 16 can be anchored in its position in any suitable way, as for example by running the stem of the tire valve 20 through a hole 21 in the base of the rim 12 and through a corresponding hole 22 in the base section 16, as shown in Figures 2 and 4.

For purposes of adjustment I prefer to provide the member 16' and 16" with teeth 23 which can be engaged by small pinions 24 arranged between the bed sections and the sides of the rim 12, and each pinion is secured to a transverse shaft 25 which can be journaled in bearings 26 in the walls of the rim 12 and provided with a head 27 which can be shaped to fit a wrench, spanner, or the like, and thus by turning either of the shafts 25, the connecting sections 16' or 16" can be moved longitudinally to effect the desired displacement or adjustment, and it will be observed that these sections can be fitted to nearly any form of rim, and that when they are contracted, the tire may be compressed and easily removed, even though the side of the wheel rim be not removable.

To make it clear that various means may be provided for extending, contracting, and securing the adjustable tire bed, I have shown in Figures 5 and 6 modified means of accomplishing these results. For example the base 12' of the rim may be provided at desired points with notches or sockets 28 and 29 to receive fastening clips 32 on the adjustable sections of the bed. The stationary bed section 16ª, for example, may be anchored by means of a generally U shaped member 30 which is fastened at its crown to the sections 16ª, and is locked in position by a cross pin 31 extending through the sides of the member and through the sides of the rim 12 and riveted or otherwise secured. The movable sections 16ᵇ and 16ᶜ of the bed can be provided with inturned clips 32 which when the members are in normal position will engage the sockets 28 or 29 and hold the bed sections against displacement.

For moving the bed sections a key 33 can be used or a similar member which is thin enough to be inserted between the tire and either side of the rim, and can enter a hole 34 in one of the adjustable bed sections and so the latter may be moved by applying longitudinal pressure with the key.

Thus it will be clear that the extensible and contractible or partly displaceable bed may be adjusted in many ways without affecting the invention.

It will also be seen that by my invention a portion of the tire base can be displaced to facilitate the easy removal or application of a tire without disturbing the flanges or side portions of the rim.

This is important, because if a whole section of the rim were removed it would most likely result in the collapse of the wheel, and for many evident reasons such a structure is impractical; but with my invention the bed only is adjustable, while the rim as a whole remains rigid and unaffected. As a result the bed can be speedily changed without the slightest danger of injury to the wheel.

I claim:—

1. A wheel rim having a circumferentially extensible and contractible tire bed supported by and between the rim flanges.

2. A wheel rim having continuous flanges and a resilient tire bed which is circumferentially extensible and contractible with respect to the outer part of the rim, said bed supported by and between the flanges.

3. A wheel rim having guides on its side walls and a circumferentially extensible and contractible resilient tire bed seated on the said guides.

4. A wheel rim having an unbroken body with side flanges integral with the body, and a tire bed lying between the flanges having a segment circumferentially movable with respect to the body and flanges.

5. A wheel rim having continuous unbroken side flanges, and a circumferentially adjustable tire bed supported by and between the flanges.

6. A wheel rim having side flanges with annular seats on their inner walls, and a circumferentially extensible and contractible tire bed lying on said seats being thereby spaced from the base of the rim.

7. A wheel rim having an unbroken body portion with side flanges having seats on their inner sides, and a removable tire bed adjustable as to length circumferentially of said seats seating on the said seats.

8. A wheel rim having a base and continuous non-separable flanges thereon, and a radially fixed and circumferentially adjustable tire bed held concentrically spaced apart from the base by the flanges.

9. A continuous wheel rim having permanent side flanges and a circumferentially extensible and contractible tire bed independent of the rim and supported by and between the flanges.

10. A tire bed for a rim comprising a sectional annular band, certain of the sections being radially fixed and circumferentially slidable relative to the other sections and interconnected with each other.

11. A tire bed, comprising a band having circumferentially movable and immovable sections the movable section being permanently interfitted with the immovable section.

12. A continuous wheel rim having permanent side flanges, seats on said side flanges adapted to support an adjustable tire bed, said bed comprising a plurality of interfitting sections, a ratchet on one of said sections, and a pinion mounted on said rim and meshing with said ratchet for adjusting the size of said adjustable tire bed.

13. A continuous wheel rim having permanent side flanges for supporting a tire, and means for engaging said tire to lock it upon said rim, said means comprising an adjustable tire bed adapted to be circumferentially extended and contracted, said bed comprising a plurality of interengaging and relatively adjustable sections.

In testimony whereof, I have signed my name to this specification this 17th day of September, 1925.

FREDERICK WILLIAM BAKER.